(No Model.)
J. D. ANDERSON.
SEWER PIPE COUPLING.
No. 514,432. Patented Feb. 13, 1894.
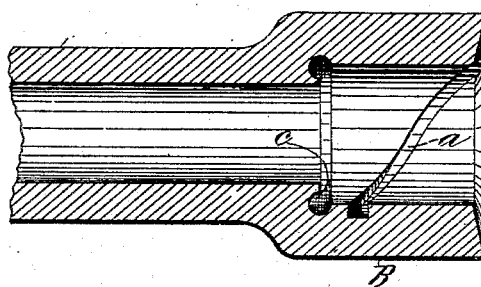 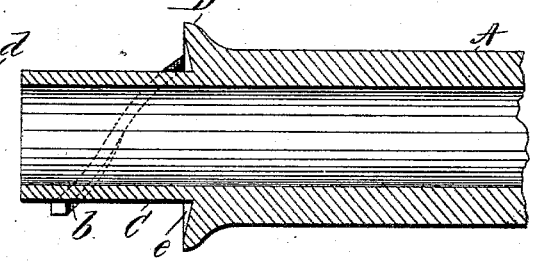
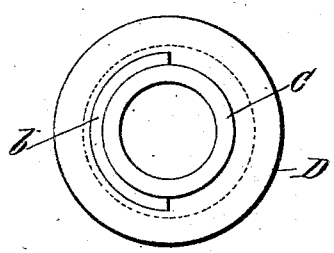
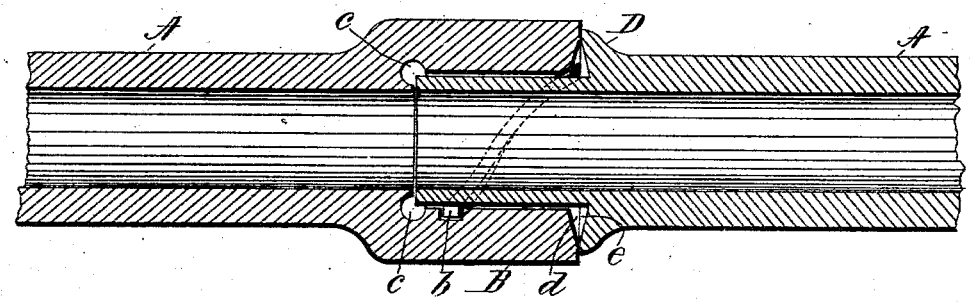
Witnesses:
John Buckler
L. H. Osgood
Inventor
John D. Anderson
By Worth Osgood
Attorney.
THE NATIONAL LITHOGRAPHING COMPANY,
WASHINGTON, D. C.

UNITED STATES PATENT OFFICE.

JOHN D. ANDERSON, OF BROOKLYN, NEW YORK.

SEWER-PIPE COUPLING.

SPECIFICATION forming part of Letters Patent No. 514,432, dated February 13, 1894.

Application filed October 10, 1893. Serial No. 487,713. (No model.)

*To all whom it may concern:*

Be it known that I, JOHN D. ANDERSON, of Brooklyn, county of Kings, and State of New York, have invented certain new and useful Improvements in Sewer-Pipe Couplings, of which the following is a full, clear, and exact description, reference being had to the accompanying drawings, and to the letters of reference marked thereon.

My invention has relation to sewer pipes and other pipes of like character formed of material more or less vitrified, and especially does it relate to that construction of such pipes whereby one section is capable of being coupled with the one next adjoining. Heretofore, in this class of pipes, the union of one section with another has commonly been made by simply introducing the smaller end of one a short distance into the larger end of the next, a considerable space being left between the two parts for the reception of a body of cement. In these old forms the cement is difficult to apply, readily leaks water and gases because of its imperfect union with the vitrified material, is easily disturbed while laying the pipe, and liable to further disturbance upon the slightest settling in any part of the pipe line.

To obviate these objectionable features and other imperfections and to produce a simple, cheap, effective and durable coupling for these pipes which coupling may be easily and perfectly operated are the chief objects of my invention,—and to accomplish these my improvements involve a new and useful form of coupling as will be herein first fully described and the particular features of invention then pointed out in the claim.

In the drawings, Figure 1 is an elevation showing two similar sections of pipe united in accordance with my invention. Figs. 2 and 3 are sectional views showing only the ends of two pipe sections, the two ends fashioned in accordance with my invention and illustrating my improved form of coupling, the parts being separated. Fig. 4 is an end elevation corresponding with Fig. 3, showing the extent of the thread or winding. Fig. 5 is a sectional view illustrating the ends of two pipe sections united after my improved manner but omitting the cement or packing.

In all the figures, like letters of reference, wherever they occur, indicate corresponding parts.

A. A. are the main portions of sections of pipe of vitrified or semi-vitrified material, which portions are generally made cylindrical and of any size and length desired. The various sections are similar in size and shape, each having at one end an enlargement or hub B of which the interior diameter is somewhat greater than the bore of the pipe, and at the other end a cylindrical portion or neck C through which the bore of the pipe extends and the exterior diameter of which corresponds with the interior diameter of hub B. When sections thus fashioned are coupled together, the bore of the pipe remains the same throughout, thus avoiding interior obstructions such as are common in the old forms referred to. The neck C is considerably elongated, as appears from the drawings, so that when finally located in place, one section is practically immovable with respect to the other except in the direction of its axis, whereby disturbance of the joint by mere settling is obviated.

Within the hub B is a spiral channel $a$ preferably formed therein before the pipe is baked or burned and extending from the front, where it is open, about half way around the inner surface of the hub,—and on the neck C is formed, preferably in like manner, a corresponding spiral thread or winding $b$, extending about half way around the neck as clearly indicated in Fig. 4. To unite these two parts the neck is inserted in the hub so that the thread $b$ will enter the channel $a$, then by turning one section in the proper direction one is drawn toward the other to its proper seating. To disturb this coupling when the pipe is laid, it is plain that one section or the other must be turned, and that this may be done, one section must back away from the other, which is practically impossible. The spiral thread and channel not only operate to draw the parts together as above explained, but form a lock by which their separation or backing away from each other is prevented after being once located or bedded for use.

That the joint may be made secure against leakage of gas or water, the hub is supplied with a cavity $c$ around the base of the opening in the hub, the face of the hub is incut or inclined as represented at *d*, and around the neck C and backing the same is a boss or enlargement D of which the face coming next to the hub is also incut or inclined as represented at *e*.

Into the cavity *c* and into the depressions *d* and *e* a small quantity of cement or other suitable packing is inserted before the coupling parts are brought together, and then when they are finally seated the cement or packing is squeezed so as to completely fill the spaces intended to be closed. The boss D, as seen, bears against the face of the hub B, so that none of the packing, whatever it may be, is exposed to corroding effects from anything on the exterior of the joint. It is therefore lasting and durable, and completely closes all outlet from the interior of the pipe whether it is of a nature to adhere to the pipe or not. When the pipe is glazed, as is frequently the case, the cement used in the old forms of joint referred to does not adhere to the surface, and this is the cause of much leakage in that form of joint or coupling, all of which is obviated in the form here shown.

The packing is very easily and quickly applied in this form and is settled to place by the mere operation of uniting the parts.

Having now fully described my invention, what I claim as new herein, and desire to secure by Letters Patent, is—

In a pipe coupling, the combination of the hub having the spiral channel, the entering neck backed by a boss or enlargement and having a corresponding thread, the exterior of the hub and the bearing face of the boss being both inclined or incut forming a packing receiving cavity at the entrance to the hub, and the hub being provided with an interior packing receiving cavity located at its base, the parts being arranged to confine and compress the packing in the two cavities, substantially as and for the purposes set forth.

In testimony that I claim the foregoing I have hereunto set my hand in the presence of two witnesses.

JOHN D. ANDERSON.

Witnesses:
W. J. MORGAN,
WORTH OSGOOD.